Patented June 23, 1936

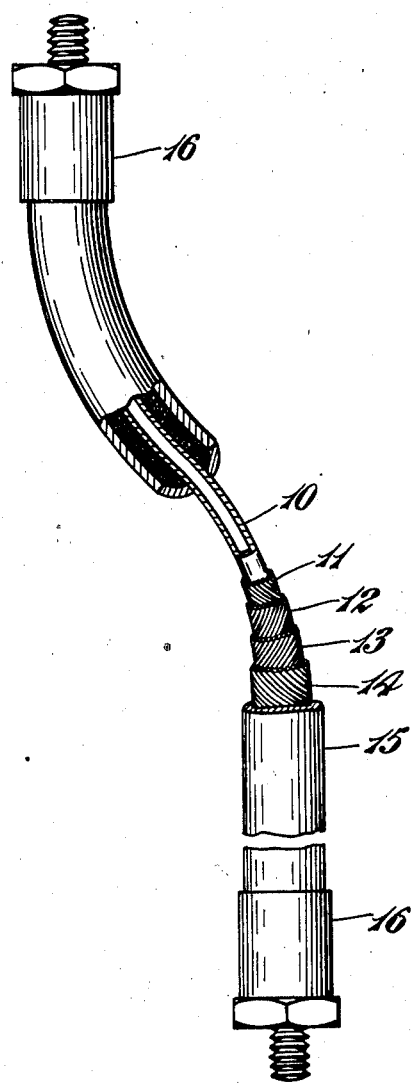

2,044,887

UNITED STATES PATENT OFFICE 2,044,887

FLEXIBLE HOSE FOR HIGH PRESSURE HYDRAULIC BRAKING SYSTEMS

Rocco Laguidara, Turin, Italy, assignor of one-half to Automotive Products Company Limited, London, England, a corporation of Great Britain, and one-half to Fabbriche Riunite Industria Gomma Torino, Turin, Italy, a joint-stock company of Italy Application July 5, 1934, Serial No. 733,903
In Italy July 5, 1933

1 Claim. (Cl. 138—55)

This invention relates to flexible hose for high pressure hydraulic braking systems.

It is well known that in high pressure hydraulic systems, more particularly in the braking equipment of motor vehicles, flexible hoses are often required for connecting together parts of the system having relative movement, and it is essential for such flexible hoses to be capable of withstanding a considerable internal pressure without any substantial increase in the volumetric capacity of said hoses, as otherwise loss of efficiency would be occasioned due to the effort expended in expanding said hoses.

It is the object of the present invention to provide an improved construction of high pressure hose for hydraulic braking systems, said hose being capable of withstanding extremely high pressures with practically no increase in internal capacity. At the same time the construction of the improved hose is such that internal friction in the walls of the hose is considerably reduced, thus lengthening the life and durability thereof.

Various constructions of hose which incorporate one or more layers of helically wound threads in various combinations, and which are obviously intended for withstanding only comparatively low internal pressures have previously been proposed, but to these we make no claim.

In a high pressure flexible hose for hydraulic braking systems comprising an inner tube of fluid-retaining material, a filamentary reinforcement surrounding said tube, and an outer covering of rubber or like material, said reinforcement being composed of a plurality of superimposed layers of threads, all of the threads composing each layer extending helically side by side in the same direction of rotation around the centre tube, according to the present invention the threads in one layer are wound directly upon those forming the next adjacent layer. One or more pairs of adjacent layers may be arranged so that the threads extend in the same direction of rotation, said reinforcement conveniently being composed of rubberized textile threads and being as a whole protected externally by a sheathing of rubber or equivalent material disposed coaxially with the hose. The thread layers forming the reinforcement may be each laid directly upon the layer preceding, and a convenient form of hose comprises an inner tube, a reinforcement consisting of four layers of helical threads, and an outer protective sheathing, said layers being arranged so that the intermediate two are laid in the same direction of rotation, while the inner and outermost thread layers are both wound in the direction opposite to that of the intermediate layers. It will be understood that by high pressure systems it is intended to refer to those hydraulic systems in which the normal maximum pressure is 500–1000 pounds per square inch, for which the internal diameter of the improved hose preferably does not exceed one quarter of an inch.

The invention is illustrated by way of example in the accompanying drawing which shows a length of hose of the preferred form partly cutaway and partly in longitudinal section so as to indicate the internal construction.

The basis of the hose consists of a central tube 10 formed from suitable fluid-retaining material. The tube 10 is surrounded by a layer 11 of helically arranged threads, the latter being conveniently composed of rubber-coated textile material and being laid parallel with one another in a manner indicated so as to provide an efficient support both circumferentially and longitudinally when taken in conjunction with the succeeding layers of reinforcement. These consist of a series of threads 12 laid upon the layer 11 so as to follow the opposite direction of rotation about the tube 10, while a further layer 13 has the convolutions of its threads arranged in the same direction as those of the layer 12. An outer layer 14 is again reversed in direction, the helix being in the same sense as that of the layer 11. It will be noticed that by forming a hose reinforcement in this way the threads are caused to follow the naturally cylindrical form of the hose and are not corrugated or otherwise crimped as in the case where a braided, woven or other similar form of reinforcement is employed. This has the direct advantage that the reinforcement threads are capable of withstanding a much increased pressure without permitting any appreciable increase in the volumetric capacity of the tube 10, while at the same time the disadvantages of the internal friction between the various parts of the reinforcement and also between the latter as a whole and the contiguous parts of the hose are completely avoided.

It has been heretofore proposed in hose of relatively large size to incorporate reinforcing layers wound in opposite directions in order that when pressure is applied within the hose, the one layer will tend to unwind in one direction and the other layer will tend to unwind in the other direction with the effect of substantially neutralizing any tendency for the hose to become kinked in use. With hose of relatively large diameter, however, the respective relation between the diameters of the reinforcing layers is such that said diameters may be said to be substantially equal. In consequence, the neutralizing effect is practically perfect.

In connection with hose of small diameter, however, with which the present invention is more particularly concerned, there is an appreciable relative difference between the diameters of the various reinforcing thread layers, and if these layers are wound clockwise or anti-clockwise alternately, the average diameter of the clockwise layer will be appreciably smaller than the average diameter of the anti-clockwise layer. Hence the neutralizing effect desired will not be secured by reason of the fact that the superimposed layers are of quite radically different diameters in small diameter hose.

With a view to equalizing as far as possible these average diameters of the reinforcing thread layers, the present invention contemplates at least four layers, the intermediate two being laid in the same direction. Thus, there is substantial equalization in the diameters of the thread layers wound in one direction with the thread layers wound in the opposite direction, at least in their neutralizing effect, against kinking of the hose in use.

Thus, in the instance shown in the present case, the layer of smallest diameter and the layer of largest diameter are wound in the same direction, while the intermediate layers are wound in the opposite direction to both the inner and outer layers and in the same direction as regards each other. Thus, the neutralizing influence of the relatively oppositely wound layers is substantially equalized.

As an outer protective for the reinforcement, the hose is provided with a sheathing 15 of rubber or equivalent material in the known manner, while its ends are equipped with suitable screw fittings, such, for instance, as those indicated at 16.

It will be understood that hose in accordance with the invention may be arranged in various ways other than the one illustrated, while any suitable number of reinforcement layers, such as those indicated at 11 to 14, may be employed. Moreover, the threads composing these may, if desired, be spaced apart circumferentially and may also be composed of any suitable material. In cases where textile threads are employed these are preferably coated or otherwise treated with rubber so that the whole of the hose wall is agglomerated when the outer sheathing 15 is vulcanized in place.

What I claim is:—

A high pressure flexible hose for hydraulic braking systems in which the bore is less than half the outside diameter, said hose comprising an inner tube of fluid retaining material, a thread reinforcement surrounding said tube, and an outer covering of rubber, said reinforcement being composed of a plurality of superimposed layers of threads arranged in pairs, the threads in each of which layers are all arranged side by side so as to extend helically along parallel lines, the outer thread layer of each pair being wound directly upon the inner layer and in the opposite direction thereto, and the pairs being arranged so that in at least one instance the inner layer of one pair is wound upon the outer layer of the preceding pair in the same direction thereas, so as to neutralize the tendency for the hose to curl when internal pressure is applied.

ROCCO LAGUIDARA.